United States Patent
Hoppe et al.

(10) Patent No.: US 10,978,236 B2
(45) Date of Patent: Apr. 13, 2021

(54) APPARATUS FOR ELECTRICALLY CONNECTING AT LEAST FOUR ELECTRICAL CONDUCTORS

(71) Applicant: SIEMENS AKTIENGESELLSCHAFT, Munich (DE)

(72) Inventors: Jens Hoppe, Schwarzenbruck (DE); Karsten Loppach, Nuremberg (DE); Klaus Mueller, Wendelstein (DE); Johann Schlager, Nuremberg (DE); Thomas Wende, Burgthann (DE); Rene Martin Wimmer, Postbauer-Heng (DE)

(73) Assignee: Siemens Aktiengesellschaft, Munich (DE)

( * ) Notice: Subject to any disclaimer, the term of this patent is extended or adjusted under 35 U.S.C. 154(b) by 366 days.

(21) Appl. No.: 16/060,531

(22) PCT Filed: Nov. 11, 2016

(86) PCT No.: PCT/EP2016/077375
§ 371 (c)(1),
(2) Date: Jun. 8, 2018

(87) PCT Pub. No.: WO2017/097533
PCT Pub. Date: Jun. 15, 2017

(65) Prior Publication Data
US 2019/0006081 A1 Jan. 3, 2019

(30) Foreign Application Priority Data
Dec. 8, 2015 (DE) .................... 10 2015 224 568.3

(51) Int. Cl.
*H01F 27/04* (2006.01)
*H01F 27/28* (2006.01)
(Continued)

(52) U.S. Cl.
CPC ........... *H01F 27/04* (2013.01); *H01F 27/022* (2013.01); *H01F 27/2828* (2013.01);
(Continued)

(58) Field of Classification Search
CPC ...... H01F 27/04; H01F 27/2828; H01F 29/02; H01F 27/022; H02G 15/08; H01R 9/0506
(Continued)

(56) References Cited

U.S. PATENT DOCUMENTS 3,000,000 A 9/1961 Eldredge
3,001,000 A * 9/1961 Wantz, Jr. ............... H01R 4/00
174/71 R
(Continued)

FOREIGN PATENT DOCUMENTS

CN 101540442 A1 9/2009
CN 201773952 U 3/2011
(Continued)

*Primary Examiner* — Tszfung J Chan
(74) *Attorney, Agent, or Firm* — Laurence Greenberg; Werner Stemer; Ralph Locher

(57) ABSTRACT

An apparatus for electrically connecting at least four electrical conductors includes a connecting element and at least four shielding pipes, which are each provided for receiving at least one conductor. In order to enable a simple and economical connection, the connecting element forms pipe connection pieces and each connection piece is integrally joined or materially bonded to a respective shielding pipe.

11 Claims, 1 Drawing Sheet

(51) Int. Cl.
*H01F 27/02* (2006.01)
*H01F 29/02* (2006.01)
*H01R 9/05* (2006.01)
*H02G 15/08* (2006.01)

(52) U.S. Cl.
CPC ........... *H01F 29/02* (2013.01); *H01R 9/0506* (2013.01); *H02G 15/08* (2013.01)

(58) Field of Classification Search
USPC ........................................ 336/55, 57, 58, 90
See application file for complete search history.

(56) References Cited

U.S. PATENT DOCUMENTS

| | | | |
|---|---|---|---|
| 4,374,596 A * | 2/1983 | Schlemmer | H02G 3/06 138/155 |
| 4,584,550 A | 4/1986 | Versteegen | |
| 8,618,427 B2 | 12/2013 | Brendel et al. | |
| 9,859,701 B2 | 1/2018 | Hoppe et al. | |
| 2009/0239751 A1 | 9/2009 | Lallouet et al. | |
| 2011/0250774 A1* | 10/2011 | Raad | H01R 13/53 439/271 |

FOREIGN PATENT DOCUMENTS

| | | | |
|---|---|---|---|
| CN | 102280729 A | * | 12/2011 |
| CN | 102280729 A | | 12/2011 |
| CN | 104269667 A | * | 1/2015 |
| DE | 1540618 A | | 1/1970 |
| DE | 1640130 B | | 5/1972 |
| EP | 2442319 A1 | | 4/2012 |
| EP | 2846336 A1 | | 3/2015 |
| FR | 797283 A | | 4/1936 |
| GB | 1086145 A | | 10/1967 |
| GB | 1109377 A | | 4/1968 |
| WO | 2012093055 A1 | | 7/2012 |
| WO | 2015036248 A1 | | 3/2015 |

* cited by examiner

APPARATUS FOR ELECTRICALLY CONNECTING AT LEAST FOUR ELECTRICAL CONDUCTORS

BACKGROUND OF THE INVENTION

Field of the Invention

The invention relates to an apparatus for electrically connecting at least four electrical conductors having a connecting element and at least four shielding pipes, which are each provided to receive at least one conductor.

The invention furthermore relates to a transformer and an inductor having an apparatus of this kind.

The apparatus mentioned at the beginning, the transformer mentioned at the beginning and the inductor mentioned at the beginning are already known from WO 2015/036248 A1. Said document shows a transformer having three windings, which are connected in parallel with one another by means of three current-carrying conductors. The transformer is furthermore equipped with a bushing electrode, which is connected to said three conductors and thus the windings by means of a fourth electrical conductor. In this case, all four conductors extend in each case through a shielding pipe. Each shielding pipe extends up to a connecting element, which is equipped with a metallic electrode and delimits a cavity. A connecting element having openings, cavity and inner electrode is complex in terms of design and therefore costly.

SUMMARY OF THE INVENTION

The object of the invention is therefore to provide an apparatus, a transformer and an inductor of the type mentioned at the beginning that makes it possible to connect the electrical conductors in a simple and cost-effective manner.

The invention achieves this object by virtue of the fact that the connecting element forms pipe connection pieces, which are connected in each case to one shielding pipe by means of a material-bonded connection.

The invention proposes a connecting element having pipe connection pieces, which are connected in each case to one shielding pipe in a material-bonded manner. A connecting element having a comparatively complex housing for joining and holding the shielding pipes is omitted in accordance with the invention. The apparatus according to the invention is therefore simplified in terms of its design, as a result of which a cost saving is produced. Furthermore, according to the invention, corners and sharp edges can better still be prevented so that high electrical field strengths can be prevented. In other words, an apparatus according to the invention dimensioned according to the prior art, given the same spacings from grounded components, can be subjected to higher voltages than the previously known apparatus. The pipe connection pieces span an angle with one another with respect to the connecting element, at which angle their ends facing away from the connecting element have the greatest possible spacing from one another. The apparatus according to the invention is, for example, part of a transformer, which has a transformer tank filled with oil. The transformer is, for example, an HVDC transformer with an AC voltage of approximately 1000 kV. As a departure therefrom, the apparatus according to the invention is part of an inductor.

The electrical conductors guided in each case by the shielding pipes are advantageously electrically connected to one another. For example, three of said electrical conductors are thus connected on the high-voltage side to windings of a transformer so that the windings are connected in parallel. The fourth conductor connected to said three conductors leads to an electrode of a bushing.

The connecting element and each shielding pipe advantageously consist of an electrically conductive material. The connecting element and each shielding pipe are preferably at the potential of the conductors and are electrically connected to said conductors. According to this advantageous development, the electrical field strengths within the transformer can be better monitored and adjusted. Sharp corners or edges that entail high electrical field strengths are prevented according to this development.

Each pipe connection piece is expediently connected to the respective shielding pipe by means of soldering or welding. According to this advantageous development, the connecting element and shielding pipe no longer have to be produced together, that is to say at the same time. In this variant, said components can instead be manufactured separately and then be connected to one another. In the context of the invention, the connection is carried out again in a material-bonded manner, wherein, in this case, soldering or welding is selected as particularly cost-effective material-bonding techniques. The separate production makes it possible to reduce costs further.

A material-bonded connection is understood here to mean an unbreakable connection between binding partners, wherein the binding partners are held together by atomic or molecular forces. In addition to soldering and welding and adhesive bonding, vulcanization or the like is also considered here.

The connecting element, each pipe connection piece and each shielding pipe advantageously have a paper insulation on the respective outer side. The paper insulation is, for example, a paper layer, which is adhesively bonded or secured in some other way to the outer surface of the respective component.

According to a further variant of the invention, each shielding pipe and the connecting element are surrounded by a barrier system made of pressboard. If the apparatus according to the invention is arranged in an oil bath, for example in the oil bath of a transformer, the oil gaps are subdivided by the barrier system at predefined spacings, as a result of which the insulation capability of the apparatus according to the invention is improved.

The number of barriers advantageously varies between 1 and 10. Within the scope of the invention, the barriers can assume basically any desired shape; they may be designed in a cylinder-shaped manner or in a chimney-like manner and have different diameters. The barriers advantageously mutually overlap one another with their ends.

According to a further variant of the invention, the connecting element and each shielding pipe are arranged in an oil bath within a housing of a transformer or an inductor.

At least one of the conductors is advantageously electrically connected in each case to one winding of the transformer or the inductor.

According to a variant of the invention, the pipe connection pieces are configured differently and/or have different diameters. In principle, the configuration of the pipe connection pieces is arbitrary. However, advantages with respect to the production of the apparatus according to the invention result when the pipe connection pieces are configured, for example, in a cylinder-shaped manner, that is to say in a hollow-cylindrical manner, and all have the same diameter.

According to a different variant, at least one pipe connection piece and the shielding pipe associated therewith span an angle "alpha" of less than 180 degrees with one another with respect to their contact point. The pipe connection pieces advantageously lie in a plane so that the pipe connection pieces lying opposite in pairs are arranged in a manner flush with respect to one another. If said angle alpha between the shielding pipe and the pipe connection piece is exactly 180 degrees, the pipe connection piece and the shielding pipe are arranged in collinear fashion. The shielding pipe runs in precisely the same direction in which the pipe connection piece extends in its longitudinal direction as well. However, if said angle is less than 180 degrees and the pipe connection pieces arranged in a plane run exactly perpendicularly or horizontally, the chamfered shielding pipe no longer runs horizontal. Instead, an air bubble in the shielding pipe can thus migrate upward. The angle alpha is preferably between 160 and 180 degrees.

BRIEF DESCRIPTION OF THE SEVERAL VIEWS OF THE DRAWING

Further expedient configurations and advantages of the invention are the subject matter of the following description of exemplary embodiments of the invention with reference to the figures of the drawing, wherein identical reference signs refer to components with the same function and wherein.

DESCRIPTION OF THE INVENTION

Figure 1:
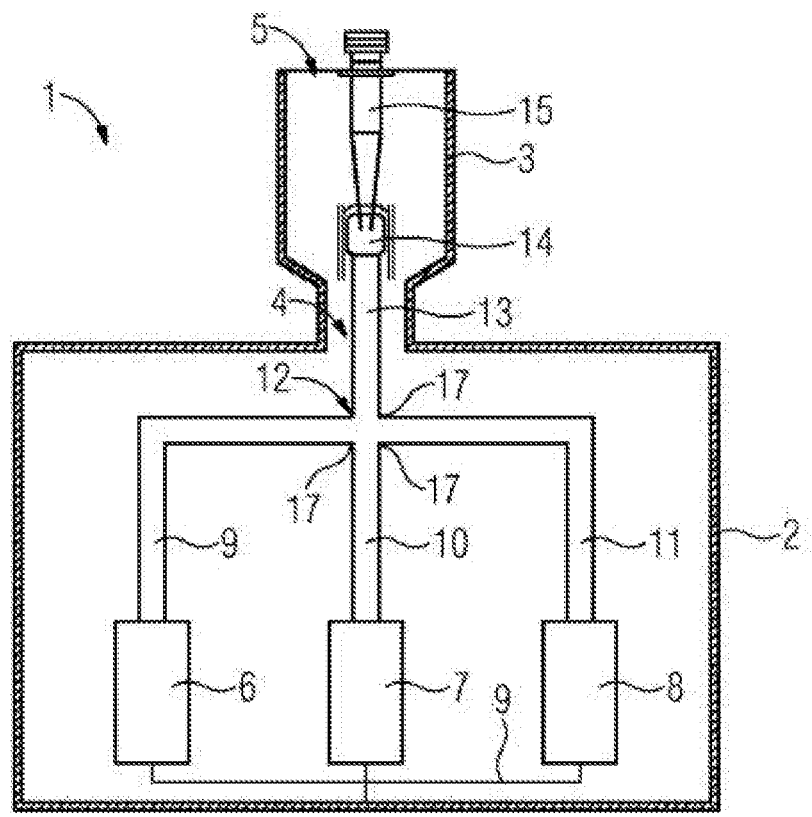
FIG. 1 shows a cross-sectional view of a transformer according to the invention having the apparatus according to the invention and FIG. 2 shows the apparatus as per FIG. 1 in an enlarged illustration.

FIG. 1 shows a sectioned side view of an exemplary embodiment of the transformer 1 according to the invention. The transformer 1 has a transformer tank 2 or housing and a dome 3 formed thereon, which expands an outlet opening 4 of the transformer tank 2 in the upward direction toward the outlet opening 5.

Windings 6, 7, and 8 can be identified inside the transformer tank 2, said windings being interconnected on the low-voltage side thereof to form a star 9 and being connected to the transformer tank 2 that is at ground potential. The windings 6, 7 and 8 are also connected in parallel with conductors (not shown in the figure here). The conductors are guided in connecting pipes 9, 10 and 11 that extend between the windings 6, 7, 8 and a connecting part 12. A further shielding pipe 13 extends upstream of the connecting element 12 to an electrode 14 for contact-connecting a bushing 15.

Figure 2:
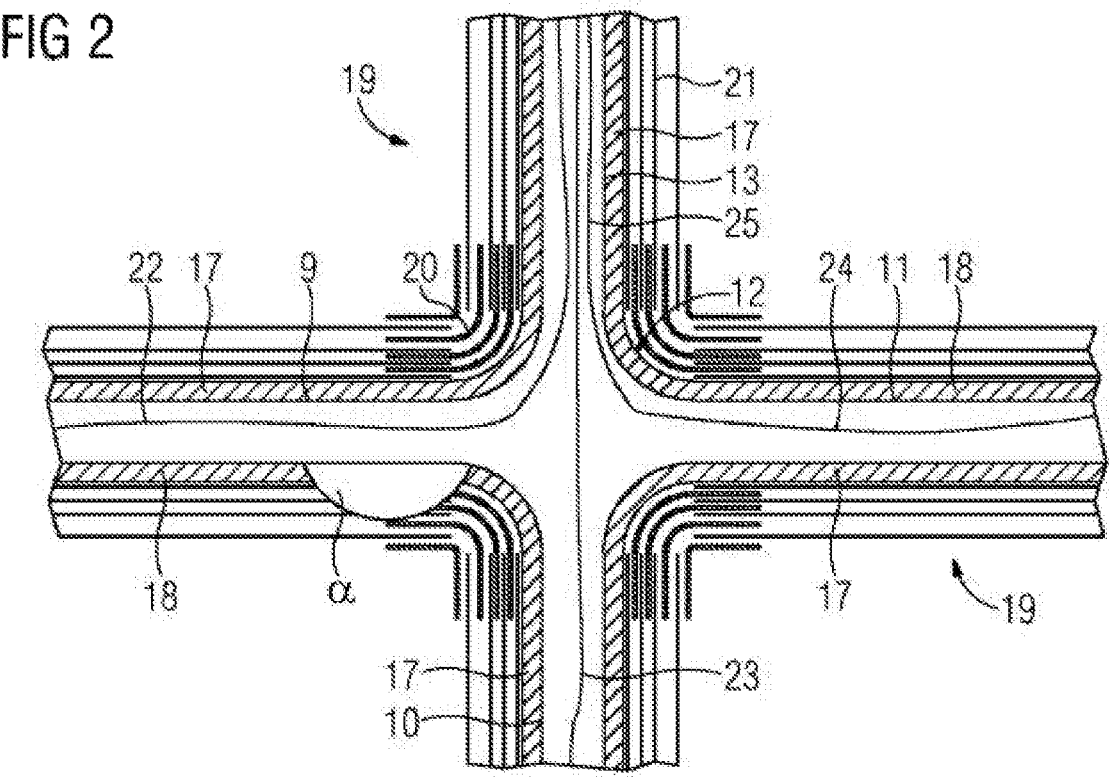

FIG. 2 illustrates that the connecting element 12 has four pipe connection pieces 17, which are arranged in the plane of the drawing in the example shown. One of the shielding pipes 9, 10, 11 and 13, respectively, is connected in a material-bonded manner to each of said pipe connection pieces 17. The transition or the contact point between the pipe connection piece 17 and the respective shielding pipe 9, 10, 11 and 13, respectively, is not illustrated in the figure. Each of said shielding pipes 9, 10, 11 and 13, respectively, and the connecting element 12 with its pipe connection pieces 17 are also equipped with a paper insulation 18, which encloses said components from the outside. In the example shown, the paper insulation has a thickness of approximately 10 mm. In different configurations of the invention, the paper insulation 18 is substantially thinner and may be just a few millimeters. In other variants, the paper insulation is 30 mm thick. The paper insulation 18 advantageously consists of paper strips that are adhesively bonded one on top of the other and overlap in different directions. However, as a departure therefrom, a couched insulation can also be provided. In the oil bath, the paper insulation absorbs the oil so that the desired electrical insulation of the components subjected to the high voltage with respect to the component parts of the transformer that are at ground potential is provided.

The paper insulation 18 is in turn surrounded by a barrier system 19 produced from pressboard, which barrier system has a thickness of preferably 1-3 mm. The barrier system 19 subdivides the oil gaps at predefined spacings, as a result of which the insulation capacity is increased. In other words, at a predefined voltage, the components carrying high voltage can be arranged closer to the housing that is at ground potential. The barriers or in other words the barrier system 19 consist(s) of pressboard and has/have curved sections 20 and sections 21 that extend in a pipe-shaped or channel-like manner and that interlock by way of their free ends. The contact point (not illustrated in the figure) or in other words the transition between the pipe connection piece 17 and the shielding pipe 9, 10, 11 and 13, respectively, which is connected to said pipe connection piece in a material-bonded manner, for example by welding, is situated approximately in the region in which said sections 20, 21 interlock by way of their free ends. The pipe connection piece and the respective shielding pipe 9, 10, 11 and 13, respectively, span an angle alpha or a of 180 degrees with respect to this welding seam. The shielding pipes 9 and 11 situated opposite one another therefore run horizontally in sections. In an exemplary embodiment deviating therefrom, the angle alpha is, however, less than 180 degrees, with the result that the shielding pipes 9 and 11 do not have an exactly horizontal section. Air bubbles can thus rise "upward", that is to say toward the connecting element 12.

In FIG. 2, the conductors 22, 23, 24 and 25 guided in the shielding pipes 9, 10, 11, 13 can also be identified. The conductors 22, 23, 24, 25 are in electrical contact with the metallic shielding pipes 9, 10, 11 and 13.

In the exemplary embodiment shown, the pipe connection pieces 17 lie opposite one another in pairs in the plane of the drawing. In this case, each pipe connection piece 17 is extended in a flush manner by the shielding pipe 9, 10, 11 and 13 respectively associated therewith. The longitudinal direction of the pipe connection piece 17 The transition or the contact point between the pipe connection pieces 17 and the respective shielding pipe 9, 10, 11 and 13, respectively, is not illustrated in the figure.

The invention claimed is:

1. An apparatus for electrically connecting at least four electrical conductors, the apparatus comprising:
   at least four shielding pipes each configured to receive at least one of the conductors;
   a connecting element forming pipe connection pieces, each of said pipe connection pieces being connected to a respective one of said shielding pipes by a material-bonded connection; and
   a paper insulation surrounding said connecting element, said pipe connection pieces and said shielding pipes.

2. The apparatus according to claim 1, wherein said connecting element and each of said shielding pipes are formed of an electrically conductive material.

3. The apparatus according to claim 1, wherein each of said pipe connection pieces is soldered or welded to a respective one of said shielding pipes.

4. The apparatus according to claim 1, wherein said pipe connection pieces have at least one of different structures or different diameters.

5. The apparatus according to claim 1, wherein said pipe connection pieces and said shielding pipes respectfully connected to said pipe connection pieces have different diameters from one another.

6. A transformer, comprising an apparatus according to claim 1.

7. An inductor, comprising an apparatus according to claim 1.

8. An apparatus for electrically connecting at least four electrical conductors, the apparatus comprising:
    at least four shielding pipes each configured to receive at least one of the conductors;
    a connecting element forming pipe connection pieces, each of said pipe connection pieces being connected to a respective one of said shielding pipes by a material-bonded connection; and
    a barrier system made of pressboard, said shielding pipes and said connecting element being surrounded by said barrier system.

9. The apparatus according to claim 8, which further comprises a housing of a transformer or an inductor, said connecting element and said shielding pipes being disposed in an oil bath inside said housing.

10. The apparatus according to claim 9, wherein said transformer or said inductor has windings, and at least one of the conductors is electrically conductively connected a respective one of said windings.

11. An apparatus for electrically connecting at least four electrical conductors, the apparatus comprising:
    at least four shielding pipes each configured to receive at least one of the conductors;
    a connecting element forming pipe connection pieces, each of said pipe connection pieces being connected to a respective one of said shielding pipes by a material-bonded connection; and
    at least one of said pipe connection pieces and said shielding pipe connected thereto forming a contact point and spanning an angle (alpha) of less than 180 degrees with one another with respect to said contact point.

\* \* \* \* \*